Patented Oct. 22, 1929

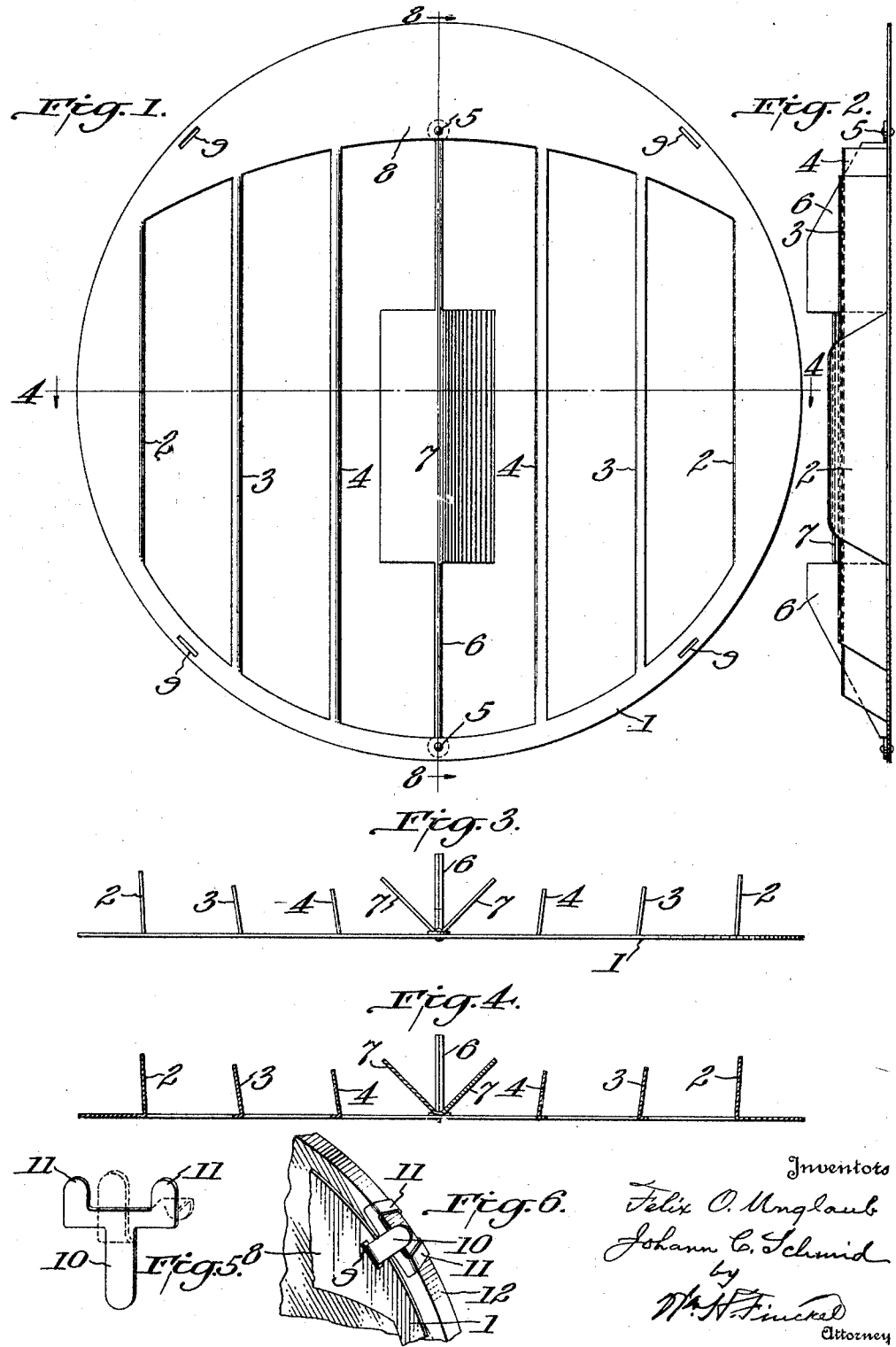

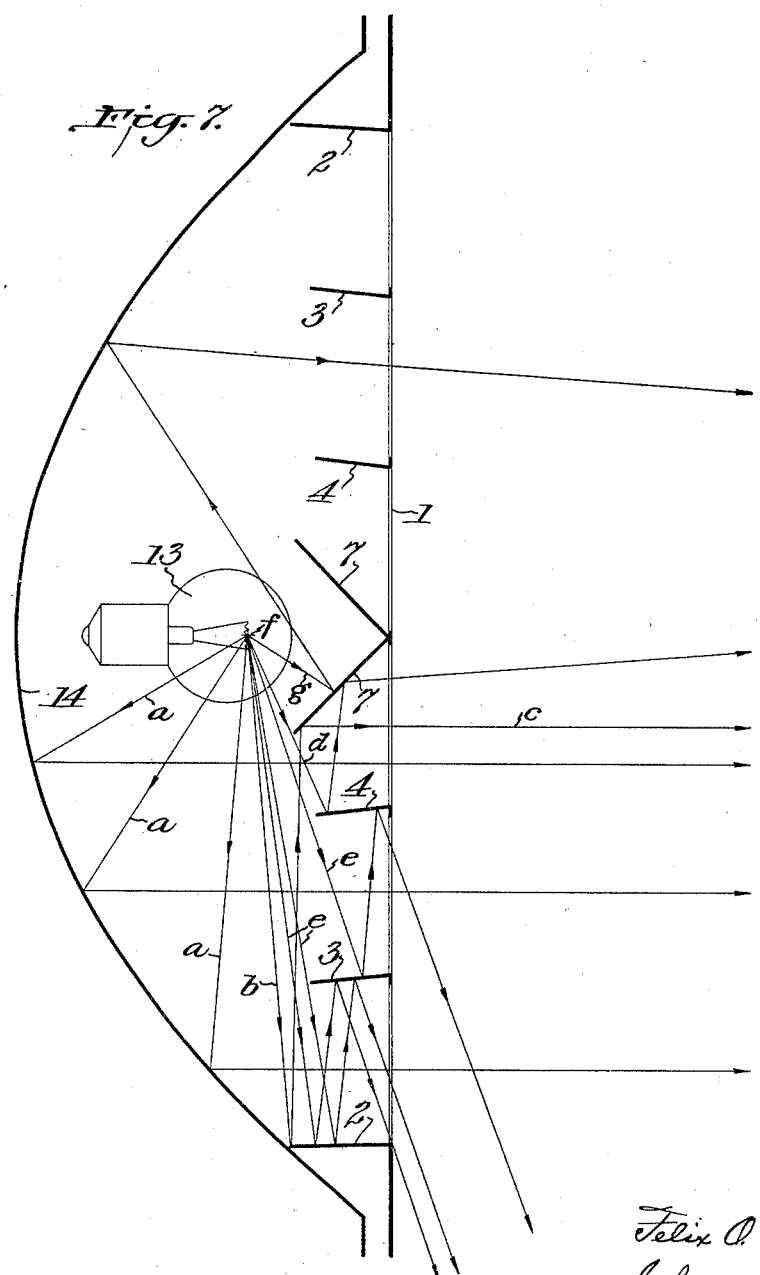

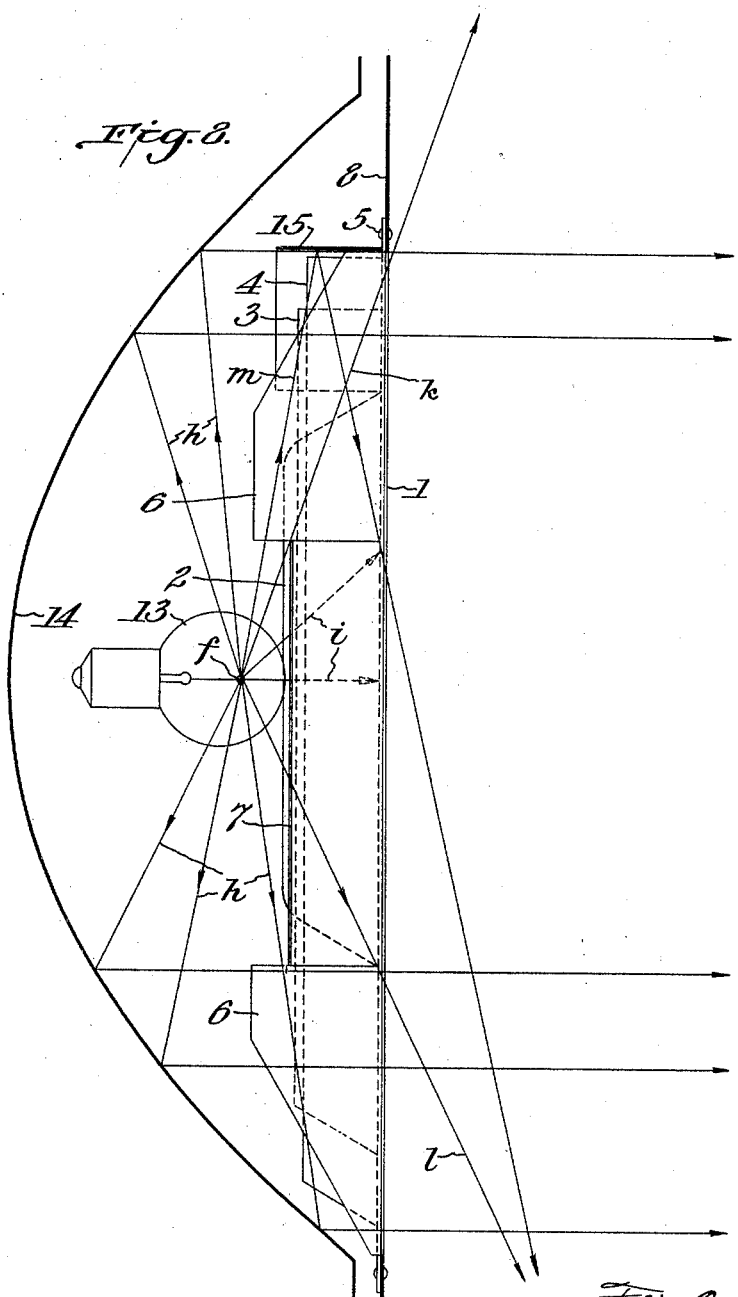

1,732,669

UNITED STATES PATENT OFFICE

FELIX O. UNGLAUB, OF ALDAN, AND JOHANN C. SCHMID, OF PHILADELPHIA, PENNSYLVANIA

MODIFIER FOR LIGHT PROJECTORS

Application filed August 8, 1927. Serial No. 211,505.

This invention relates to light projectors, and particularly to a device for use with such projectors whereby the beam of light projected thereby may be so modified as to eliminate glare without reducing the intensity of the beam or the distance to which it may be projected.

The device of our invention is designed primarily for use in connection with the headlights of motor vehicles, but obviously, due to its advantageous influence upon the projected beam of light is suitable for use in connection with searchlights, beacons, floodlights such as are used for lighting aviation landing fields or aerodromes, and in other installations where a light of high intensity and penetration but non-glaring, is desirable.

The object of the invention is to produce a device having means whereby the glaring rays of the beam of light may be eliminated, but which at the same time produces a beam of light free of blind spots or other undesirable characteristics.

The invention consists in a modifier for light projectors, comprising means arranged in the path of the light rays proceeding directly from the source of light and functioning to prevent the direct projection of such rays, and means flanking such first mentioned means and so arranged as to reflect light rays thereupon and to prevent undue lateral diffusion of the projected beam of light, combined, if desired, with means for obstructing projection of those rays of light which are reflected from the upper portion of the reflector of the light projector, as we will proceed now to explain and finally claim.

In the accompanying drawings illustrating the invention, in the several figures of which like parts are similarly designated, Figure 1 is a front elevation of the device of our invention. Fig. 2 is a side or edge view thereof. Fig. 3 is a top view. Fig. 4 is a transverse section taken substantially on the line 4—4 of Fig. 1. Fig. 5 is perspective view of an attaching device. Fig. 6 is a fragmentary perspective view of one of the attaching devices in position to hold the modifier upon the lens or glass front of the projector. Fig. 7 is a diagrammatic sectional view on line 4—4 of Fig. 1, showing the device of the invention associated with the ordinary parabolic reflector and illustrating the effect of the device upon the rays of light. Fig. 8 is a diagrammatic sectional view similar to Fig. 7 but taken on line 8—8 of Fig. 1.

As shown in Figs. 1 to 4, the device comprises a plate 1 shaped to conform to the shape of the headlight or other projector with which it is used, usually circular, and so slitted and bent as to form pairs of vanes 2—2, 3—3, and 4—4, arranged vertically of and at appropriate angles to the plate 1, as will be later described, and so shaped and proportioned as to best suit them for the purposes for which they are designed.

Arranged centrally, vertically of the plate 1, and connected thereto as by rivets 5, is an obstructor member 6 formed of a piece of sheet material bent upon itself, as shown, and provided with a V-shaped portion 7 which is arranged to lie directly in front of the source of light and intercept or obstruct the passage of rays of light proceeding directly forwardly from the source of light.

As shown in Fig. 1, the upper portion of the plate 1 is left intact to form a guard or shield 8 which will intercept rays of light reflected from the upper portion of the reflector of the projector.

Owing to the light modifying properties of our device it may be used with a front glass of ordinary window or plate glass, and may be mounted in the projector or headlight by attaching it to such glass. For this purpose we provide the plate 1 with a plurality of suitably located slots 9 adjacent to its periphery, and engage with these slots the tangs 10 of attaching devices such as shown in Figs. 5 and 6, same being bent up as shown in dotted lines (Fig. 5.) These attaching devices have lugs 11 which are bent over the edge of the glass 12 (Fig. 6). Obviously other means may be used for appropriately mounting the modifiers in proper operative position in headlights or other projectors.

All parts of the plate 1, vanes 2, 3 and 4, and obstructor member 6 and its V-shaped portion 7 are provided with highly-polished reflecting surfaces, preferably nickel or silver plated to maintain their lustre, and all of these parts are constructed preferably of light-weight relatively stiff sheet metal, though it is possible that other materials may be equally well empoyed.

Referring now to Fig. 7, it will be seen that practically all of those rays of light emanating from the source of light (here shown as an incandescent lamp 13 having its filament adjusted in the focus $f$ of the parabolic reflector 14) and falling upon the reflector 14, will be projected between the vanes 2, 3 and 4 and the members 6 and 7. Several of such rays are indicated by the letter $a$.

Other rays of light, such as that indicated by $b$, which fall upon the vanes 2, will be reflected therefrom upon the member 7, the relative angles of the vanes 2 and member 7 being such that these rays will be again reflected from the member 7 as indicated at $c$ in substantial parallelism with the rays reflected from reflector 14. In order that this reflection of rays from vanes 2 to member 7 may take place, the vanes 3 stand away from the plate 1 less than do the vanes 2, and the vanes 4 less than the vanes 3.

Other rays of light, such as that indicated by $d$, which fall upon the vanes 4 will be reflected therefrom upon the member 7, and thence forwardly in the beam.

It will thus be seen that although the V-shaped member 7 obstructs or intercepts rays of light proceeding directly from the source, it is illuminated by light reflected from the vanes 2, 3 and 4 and in turn reflects this light into the beam of the projector, thus eliminating any blind spot or shadow in the beam which would be present were it not so illuminated.

Those rays of light, such as $e$, which fall upon the vanes 2, 3 and 4 are reflected back and forth between the surfaces of these vanes until they pass them and are projected in a diffused glow to the sides of the projector. This latter is important in automobile headlights for the reason that a certain amount of lateral illumination is required by law to light the sides of the road.

Those rays of light, such as $g$, which are projected upon the inner reflecting surfaces of the V-shaped member 7 will be reflected upon the reflector 14 and thence reflected will join the beam.

Referring now to Fig. 8, it will be seen that all of those rays of light, such as $h$, which fall upon the reflector and do not, after reflection, strike the members 2, 3, 4, 6, 7 and 8 will be projected in parallelism in a beam from the headlight or projector. Those rays which do strike upon the members mentioned will be reflected therefrom, either back against the reflector 14 and thence again forwardly, or between the members.

Those rays, such as $i$, which proceed directly from the source of light will strike the member 7 and be thereby reflected against the reflector 14, but cannot proceed directly outwardly in a glaring beam.

Rays, such as $k$, which, proceeding upwardly, clear the top of member 7 will be so apart from the projected beam of parallel rays as not to glare, and those, such as $l$, which proceed downwardly will produce no glare.

If desired, we may provide a shield 15 (Fig. 8) which extends in a curve over the tops of the vanes 2, 3 and 4, and any rays, such as $m$, which strike this shield will be reflected therefrom downwardly, as indicated.

It will thus be seen that, by the provision of the various members of our modifier, we produce a luminous beam composed wholly of reflected, intense light, free of glare.

In practice it has been found that with our device in use a lamp or light source of high candle power may be used without producing a glaring light.

Various changes and modifications in the device to adapt it to specific installations are contemplated as within the spirit of the invention and the scope of the following claims.

What we claim is:—

1. The combination with a light projector having a source of light and a reflector, of a light modifier comprising a plate adapted to be positioned in front of said reflector and light source and provided with a V-shaped obstructor member arranged vertically in the path of rays of light proceeding directly from said source and having its concave surface facing said source, and a plurality of vertical reflecting vanes flanking said obstructor member and arranged at various angles relatively thereto, said vanes being adapted to reflect upon the outer surface of said obstructor member rays of light falling upon them, whereby such rays may be reflected from said obstructor member into the projected beam of light.

2. A modifier for light projectors, comprising a plate provided with a substantially centrally and vertically arranged V-shaped obstructor member having inner and outer reflecting surfaces, and a plurality of vertical reflecting vanes flanking said member at both sides and standing away from said plate at various angles, said vanes being of various widths, whereby light falling upon them will be reflected upon said obstructor member.

In testimony whereof we have hereunto set our hands this 5th day of August, A. D. 1927.

FELIX O. UNGLAUB.
JOHANN C. SCHMID.